United States Patent [19]
Lee et al.

[11] Patent Number: 6,006,553
[45] Date of Patent: Dec. 28, 1999

[54] HEAT DISSIPATING BLADES FOR A MOTOR OF A WASHING MACHINE

[75] Inventors: Min-Soo Lee, Uiwang; Hwan-Young Choi, Anyang, both of Rep. of Korea

[73] Assignee: Samsung Electronics Co., Ltd., Suwon, Rep. of Korea

[21] Appl. No.: 09/008,779

[22] Filed: Jan. 20, 1998

[30] Foreign Application Priority Data

Feb. 18, 1997 [KR] Rep. of Korea .......................... 97-4860

[51] Int. Cl.⁶ .................................................. D06F 39/00
[52] U.S. Cl. ................................................ 68/23.3; 68/133
[58] Field of Search ........................... 68/23.3, 23.7, 68/12.24, 12.16, 133

[56] References Cited

U.S. PATENT DOCUMENTS

| | | |
|---|---|---|
| 2,300,231 | 10/1942 | Landgraf . |
| 2,656,702 | 10/1953 | Chapin . |
| 2,669,856 | 2/1954 | Williams ................................ 68/12.16 |
| 2,734,122 | 2/1956 | Flannery . |
| 3,103,227 | 9/1963 | Long . |
| 3,807,420 | 4/1974 | Donselman et al. . |
| 4,998,052 | 3/1991 | Edrman et al. ........................... 68/23.7 |
| 5,187,954 | 2/1993 | Kim et al. ................................. 68/133 |

FOREIGN PATENT DOCUMENTS

| | | |
|---|---|---|
| 6-66261 | 9/1994 | Japan . |
| 8-309086 | 11/1996 | Japan . |

*Primary Examiner*—Frankie L. Stinson
*Attorney, Agent, or Firm*—Burns, Doane, Swecker & Mathis, L.L.P.

[57] ABSTRACT

A clothes washing machine has a motor which includes a stator, and a rotor disposed around the stator. The rotor includes a disk-shaped plate having radial blades disposed on an upper surface thereof. The blades are situated beneath the stator and generate a flow of turbulent cooling air along the stator in response to rotation of the rotor.

2 Claims, 6 Drawing Sheets

HEAT DISSIPATING BLADES FOR A MOTOR OF A WASHING MACHINE

BACKGROUND OF THE INVENTION (1) Field of the Invention

The present invention relates to a motor of a clothes washing machine.

(2) Description of the Related Art

Generally, a clothes washing machine includes a main body defining an outer configuration thereof, a water tub installed within the body, and a spin basket and blade mounted within the water tub. A power system for driving the spin basket and blade is mounted under the water reserving basket.

The power system typically comprises a motor, a power transmission system, and a belt for connecting the motor to the power transmission system. This will be described hereinbelow with reference to FIG. 6.

Figure 6:
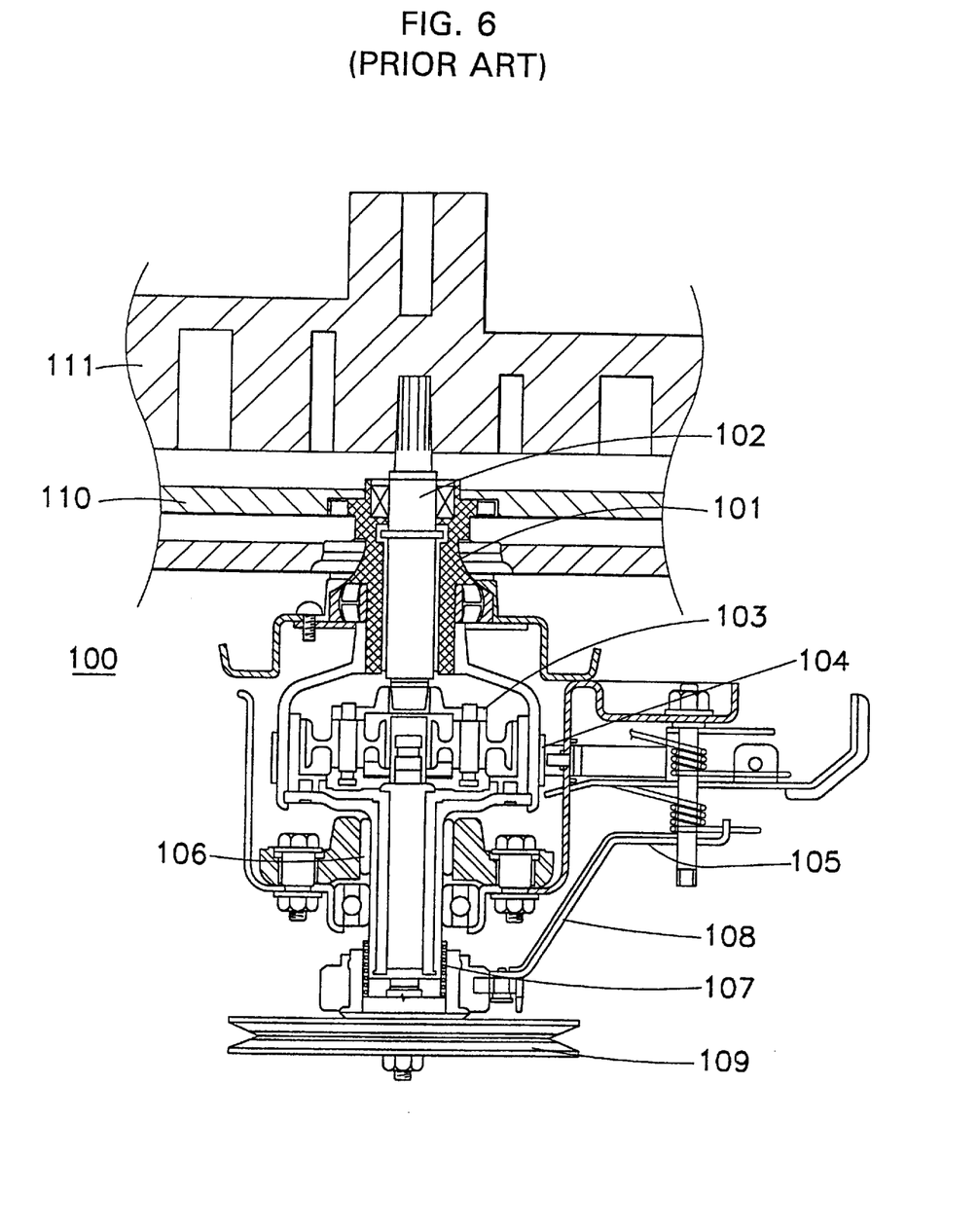
FIG. 6 is a vertical view showing a conventional power system.

As shown in the drawing, a conventional power system comprises a power transmission system 100 having a drive motor (not shown). The power transmission system 100 comprises a hollow dehydrating (spin-dry) shaft 101 and a laundering shaft 102 inserted into the hollow dehydrating shaft 101. The laundering shaft 102 is divided into upper and lower halves, with a planetary gear unit 103 being disposed therebetween. The planetary gear unit 103 changes a rotating speed of the power transmission system 100.

A brake band 104 and a brake lever 105 are disposed beside the dehydrating shaft 101 to brake the rotation of the dehydrating shaft 101, for suppressing an idle rotation of the spin basket 110. A one-way bearing 106, permitting the dehydrating shaft 101 to rotate in only one direction, is mounted on an outer circumference of the dehydrating shaft 101. In addition, a clutch spring 107 and a clutch lever 108 for transmitting/interrupting power from the motor to the dehydrating shaft 101 or the laundering shaft 102 are mounted under the one-way bearing 106. A pulley 109 on which a belt (not shown) is engaged is mounted on a lower end of the laundering shaft 102.

In this conventional power transmission system 100, torque of the motor is selectively transmitted to either a rotating blade 111 or to both the blade 111 and the spin basket 110 through the clutch spring 107, thereby performing the washing and dehydrating operations respectively. To achieve this, it is necessary that the clutch spring 107 has a high degree of tensile strength to enable the transmission or interruption of torque from the motor to either the dehydrating shaft 101 or the laundering shaft 102, both of which are rotated at a high speed. However, the manufacturing process for such a spring having high tensile strength is complicated, and, as a result, manufacturing costs are increased.

In addition, the brake band 104 for preventing the spin basket 110 from idling rotationally during the washing operation is, when it brakes the spin basket 110 in one direction, subjected to high resistance against force generated when the spin basket 110 is acted on by a water current within the water tub. The above described one-way bearing 106 must be used as a result, making the structure complicated and increasing manufacturing costs. Finally, an unpleasant noise is generated during the braking operation of the brake band.

As described above, the conventional power system of a washing machine is complicated with regard to the arrangement of parts for performing the washing, dehydrating and braking operations, making it difficult to manufacture the same and increasing manufacturing costs. In addition, because of the large number of parts needed for this complicated arrangement, much space is required which, in turn, acts to increase the overall size of the washer.

To solve the above described problems, in recent years, a direct-coupled washing machine in which the power transmission system is directly connected to the motor has been developed. A brushless direct current motor is used for the direct-coupled washing machine. The brushless direct current motor is reversible and capable of increasing and decreasing the rotating speeds. The brushless direct current motor is designed to operate by electromagnetic induction between a stator and magnets mounted on a rotor.

However, when the motor is operated, variable magnetic force acts on a core of the stator, generating an eddy current and causing loss of hysteresis by the change in magnetizing force. The eddy current and hysteresis loss results in a heating of the stator, and, if the stator becomes over-heated, the driving efficiency of the motor deteriorates, reducing the life span of the motor.

SUMMARY OF THE INVENTION

Therefore, the present invention is made in an effort to solve the above described problems.

It is an object of the present invention to provide a motor for a clothes washing machine having a cooling means for removing heat caused by the operation of the direct current motor.

To achieve the above object, the present invention provides a motor comprising a stator, and a rotor disposed around the stator, in which the rotor has a disk-shaped portion having cooling means for generating a flow of turbulent cooling air along the stator in response to rotation of the rotor.

Preferably, the cooling means comprises a plurality of radial blades projecting upward from an upper surface of the disk-shaped portion.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF A PREFERRED EMBODIMENT OF THE INVENTION

Reference will now be made in detail to a preferred embodiment of the invention, illustrated in the accompanying drawings. Wherever possible, the same reference numbers will be used throughout the drawings to refer to the same or like parts.

Figure 1:
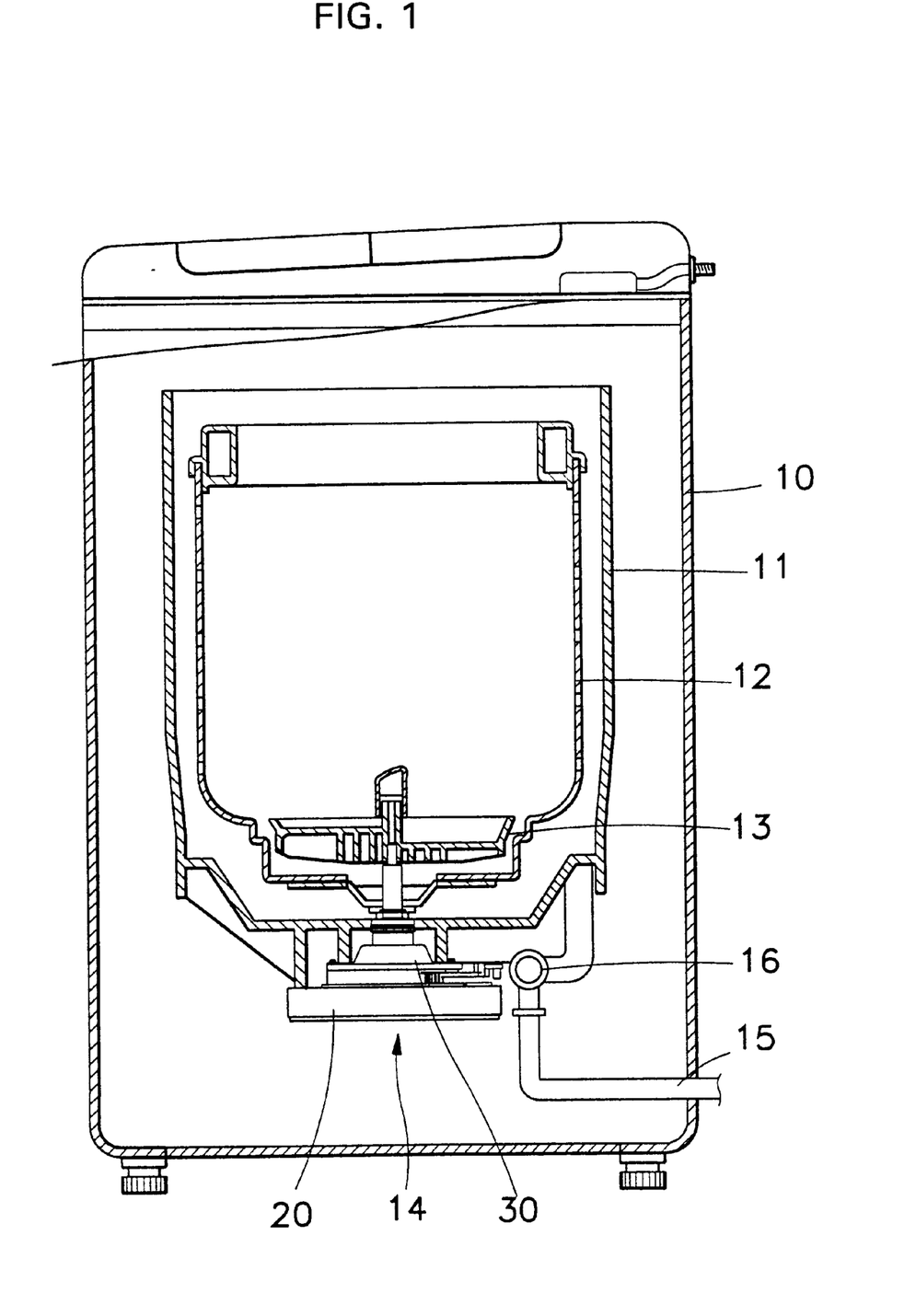
FIG. 1 is a vertical sectional view illustrating a washing machine where a power system according to the present invention is employed.

Referring first to FIG. 1, the inventive clothes washing machine of the present invention comprises a main body 10 defining an outer configuration thereof and a water tub 11 installed inside the main body 10 which holds water. A spin basket 12, inside of which laundry is washed, is provided inside the water tub 11. Installed above a bottom surface of the spin basket 12 is a pulsator 13 which oscillates in forward and reverse directions so as to generate water currents.

A power system 14, for driving the pulsator 13 and the spin basket 12, is installed on an underside of the water tub 11. The power system 14 comprises a reversible motor 20 and a power transmission system 30, which transmits rotating force of the reversible motor 20.

The power transmission system 30 is structured such that torque of the motor 20 can be transmitted to the pulsator 13 or, during dehydration, to both the pulsator 13 and the spin basket 12.

In addition, a drain hose 15 is mounted on the right side (in the drawing) of the water tub 11, the drain hose 15 draining the water from the water tub 11 to the outside of the main body 10. A drain valve 16 for opening/closing the drain hose 15 is mounted on the drain hose 15. A drain motor (not shown), which controls the operation of the drain valve 16 and the power transmission system 30, is mounted between the drain valve 16 and the power transmission system 30.

Figure 2:
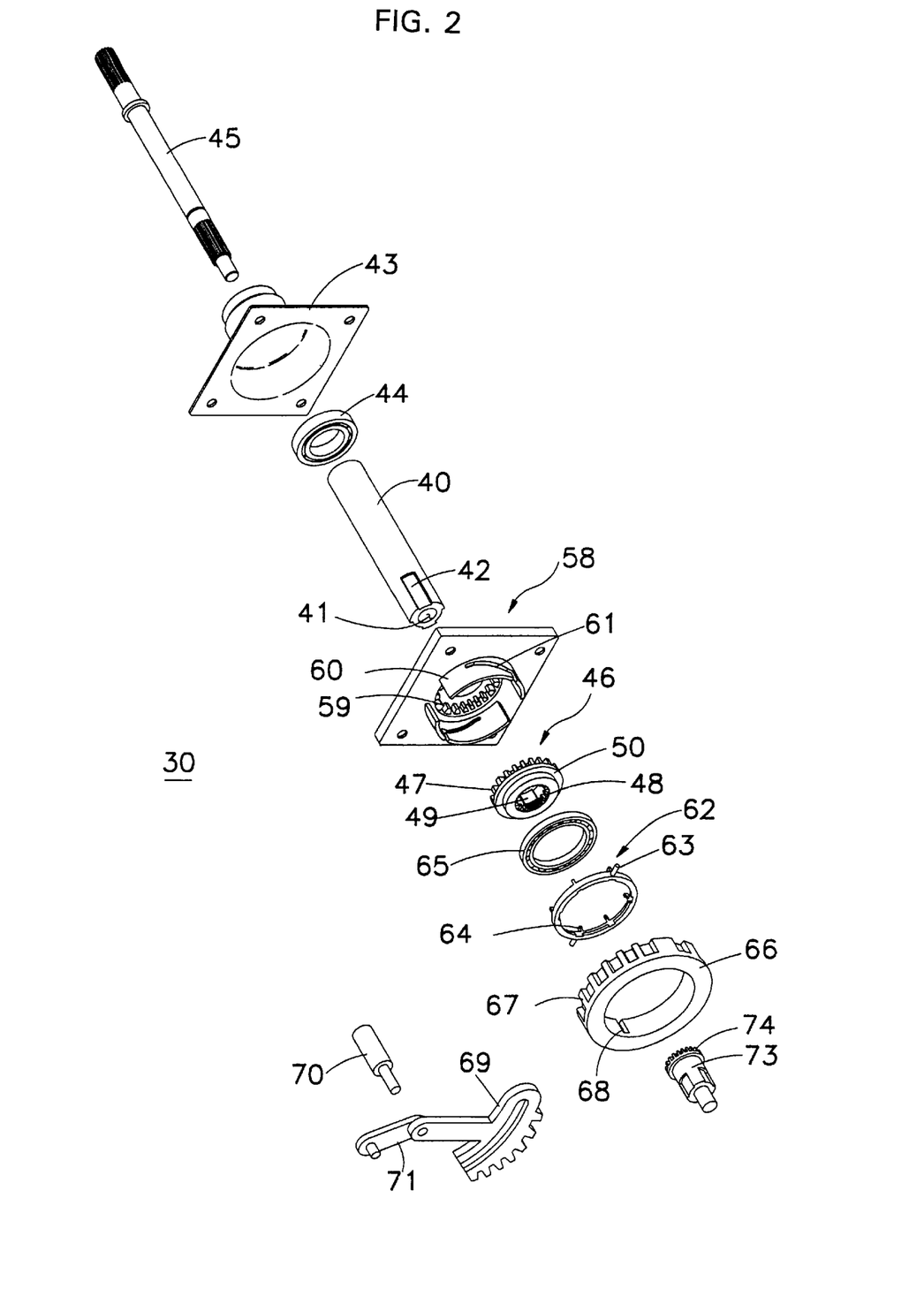
FIG. 2 is an exploded perspective view of a power system according to a preferred embodiment of the present invention.

The power transmission system 30 of the power system 14 will be described hereinafter more in detail with reference to FIGS. 2 and 3.

As shown in the drawings, the power transmission system 30 comprises a dehydrating shaft 40 having a hollow section 41 and coupled at its upper portion to the spin basket 12 and passing through a bottom surface of the water tub 11, and a coupling plate 43, mounted on an inner bottom surface of the water reserving basket 11, for supporting the dehydrating shaft 40. A bearing 44 is interposed between the coupling plate 43 and the dehydrating shaft 40 so as to provide relative rotation therebetween.

The power transmission system 30 further comprises a laundering shaft 45 extending through the dehydrating shaft 40, an upper end of which is coupled to the pulsator 13 and a lower end of which is coupled to a rotor 22 of the reversible motor 20.

A ring-shaped connecting gear 46 is slidably mounted on the dehydrating shaft 40 so as to selectively connect the dehydrating shaft 40 to the laundering shaft 45 for common rotation. When the connecting gear 46 is lowered, the dehydrating shaft 40 rotates together with the laundering shaft 45, and when raised, only the laundering shaft 45 is rotated.

A coupling gear 53 which is designed to integrally rotate with the reversible motor 20 is mounted on a lower end of the laundering shaft 45. The coupling gear 53 is engaged with the connecting gear 46 when the connecting gear 46 is lowered.

The power transmission system 30 will be described more in detail in connection with the connecting gear 46.

The connecting gear 46 is provided with inner teeth 48 formed on an inner lower portion thereof and outer teeth 47 formed on an outer upper portion thereof. Guide projections 49 are formed on upper sides of the inner teeth 48. A plurality of guide grooves 42 are formed on a lower end of the dehydrating shaft 40, such that the guide projections 49 of the connecting gear 46 are slidably disposed in the guide grooves 42.

In addition, coupled on an outer bottom surface of the water tub 11 is a fixing plate 58. The fixing plate 58 is provided with inner teeth 59 meshing with the outer teeth 47 of the connecting gear 46 when the connecting gear 46 is raised, thereby suppressing rotation of the dehydrating shaft 40.

To allow the connecting gear 46 to elevate along the guide grooves 42 of the dehydrating shaft 40, there is provided elevating guide means comprising an elevating guide member 60 screwed to the fixing plate 58. The elevating guide member 60 is composed of two halves. Each of the halves is provided with an inclined elevating guide slit 61 having an opened lower end.

The elevating guide means further comprises an elevating ring 62 having elevating projections 63 which are received in respective ones of the guide slits 61. The elevating ring 62 is engaged with a stepped portion 50 of the connecting gear 46, with a bearing 65 interposed therebetween. The bearing 65 is fixedly disposed on the projections 63 formed on an upper end of the elevating ring 62. The bearing 65 prevents transmission of rotary force from the elevating ring 62 to the connecting gear 46 and vice versa.

Coupled on the elevating projections 63 is an elevating gear 66 which enables the elevating projections 63 of the elevating ring 62 to elevate along the elevating guide slits 61, thereby guiding the elevating operation of the connecting gear 46.

The elevating gear 66 is provided with teeth 67 formed on an outer circumference thereof and a pair of grooves 68 formed corresponding to the elevating projections 63.

A rotating gear 69 for rotating the elevating gear 66 is engaged with the teeth 67 of the elevating gear 66. Connected to the rotating gear 69 by a connecting pin 70 is a connecting bar 71 to which a driving force from the drain motor (not shown) is transmitted.

Figure 3:
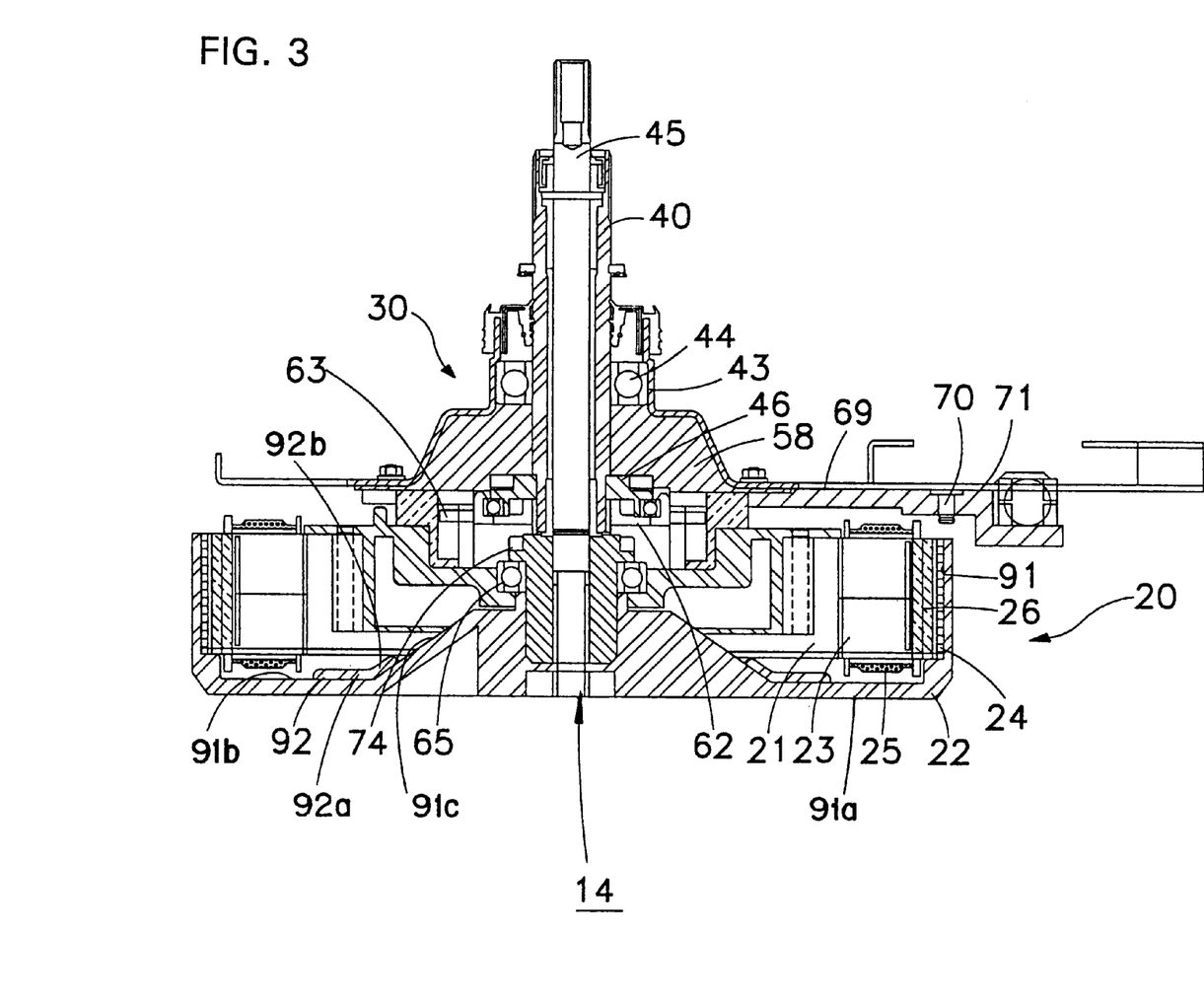
FIG. 3 is a sectional view showing a power system according to a preferred embodiment of the present invention.

The reversible motor 20 is a brushless direct current motor having a rotor 22 and a stator 21 disposed inside the rotor 22 as shown in FIG. 3.

The coupling gear 53, engaged with the laundering shaft 45 of the power transmission system 30, is coupled on a central portion of the rotor 22. The rotor 22 comprises a housing inside on which a rotor core 24 is coupled. Permanent magnets 26 are mounted along an inner circumference of the rotor core 24. The stator 21 is comprised of a stator core 23 facing the magnets 26 and a coil 25 wound around the stator core 23.

Figure 4:
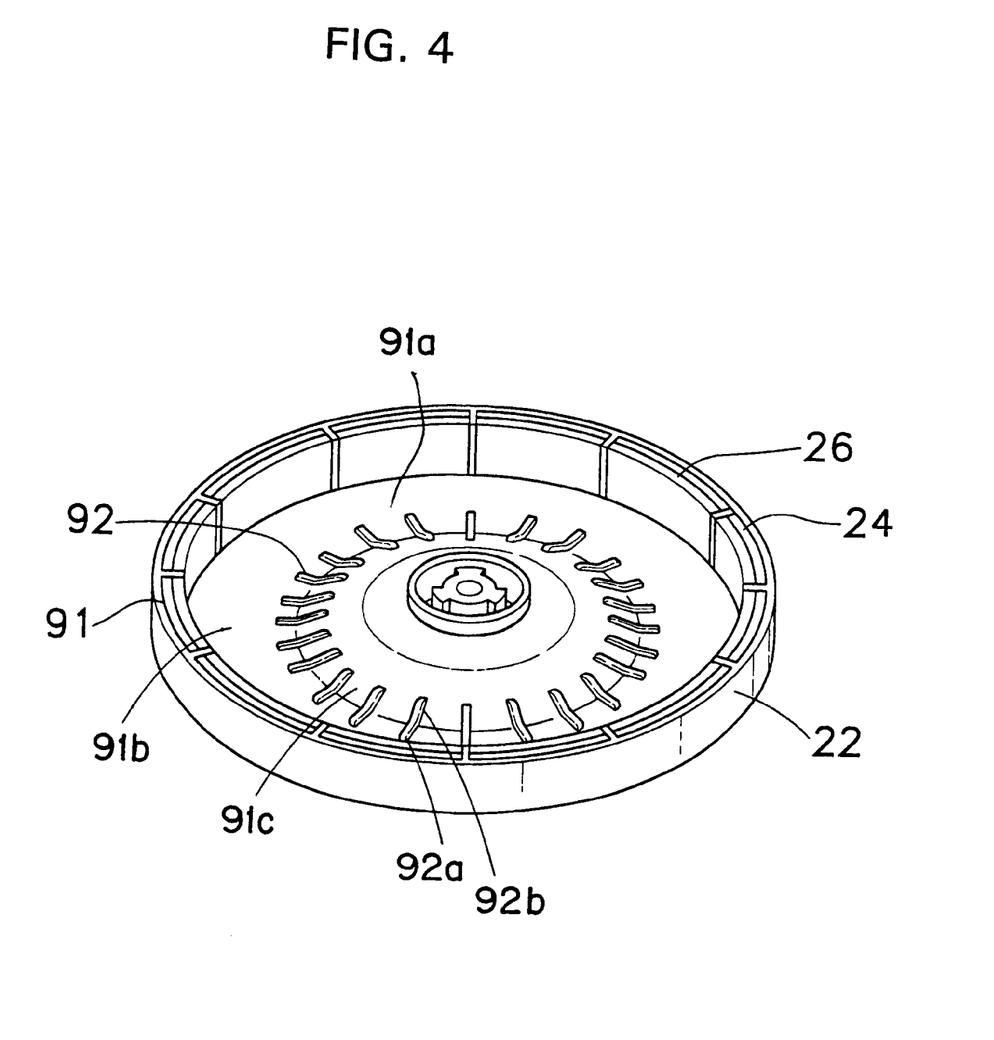
FIG. 4 is a plan view illustrating a rotor according to the preferred embodiment of the present invention.

The housing of the rotor 22 comprises a disk plate 91a and an outer circumferential wall 91 formed on an outer circumference of the disk plate. The rotor core 24 and the magnets 26 are mounted on a radially inner surface of the circumference wall 91. Heat dissipating means for dissipating heat generated in the stator when the motor 20 is operated, is provided on a top surface of the disk plate 91a of the rotor 22. The heat radiating means comprises a plurality of blades 92 projecting upwardly from the top surface of the disk plate and extending in a radial direction so as to circulate air through the motor and also to make turbulent the air located immediately beneath the stator, thereby increasing the dissipation of heat generated in the stator 21 (see FIGS. 4 and 5). As can be seen in FIGS. 3 and 4, the top or upper surface includes a radially extending portion 91b and a sloping portion 91c sloping upwardly toward the axis of rotation of the disk from a radially inner edge of the radially extending portion. The radially extending portion 91b lies in a radial plane oriented perpendicularly to the axis, and the sloping portion 91c slopes upwardly out of that plane. The blades 92 are disposed below the stator 21. Each of the blades 92 includes a radially outer segment 92a situated on the radially extending portion, and a sloping segment 92b situated on the sloping portion 91c of the disk upper surface, whereby the sloping segment 92b extends to a higher elevation than the radially extending segment 92a.

The operation of the above described power system 14 of the washing machine according to the present invention will be described hereinafter.

Describing first a washing operation, when electric power is applied to the washing machine, the rotating gear 69 is rotated by the drain motor (not shown) which is driven by initial input current. By the rotation of the rotating gear 69, the elevating gear 66 rotates, rotating the elevating ring 62 engaged with the elevating gear 66. Accordingly, the elevating projections 63 ascend along the elevating guide slits 61 of the elevating guide member 60 such that the elevating ring 62 ascends. As a result, the connecting gear 46 ascends along the guide grooves 42 of the dehydrating shaft 40 without rotating (due to the presence of the bearing 51) so that the outer teeth 47 of the connecting gear 46 mesh with the inner teeth 59 of the fixing plate 58. Hence, the dehydrating shaft cannot rotate.

In the above state, after laundry is placed in the spin basket 12 and water is fed to the water tub 11, and electric current is applied to the motor 20, the rotor 22 of the motor 20 rotates in the forward and reverse directions. Here, the laundering shaft 45 and the coupling gear 53 are rotated by the motor 20, thereby oscillating the pulsator 13 coupled to the laundering shaft 45 and performing the washing/rinsing operation.

When the washing/rinsing operation is finished, the water within the water tub 11 is drained by the opening of the drain valve 16 according to the operation of the drain motor (not shown).

Figure 5:
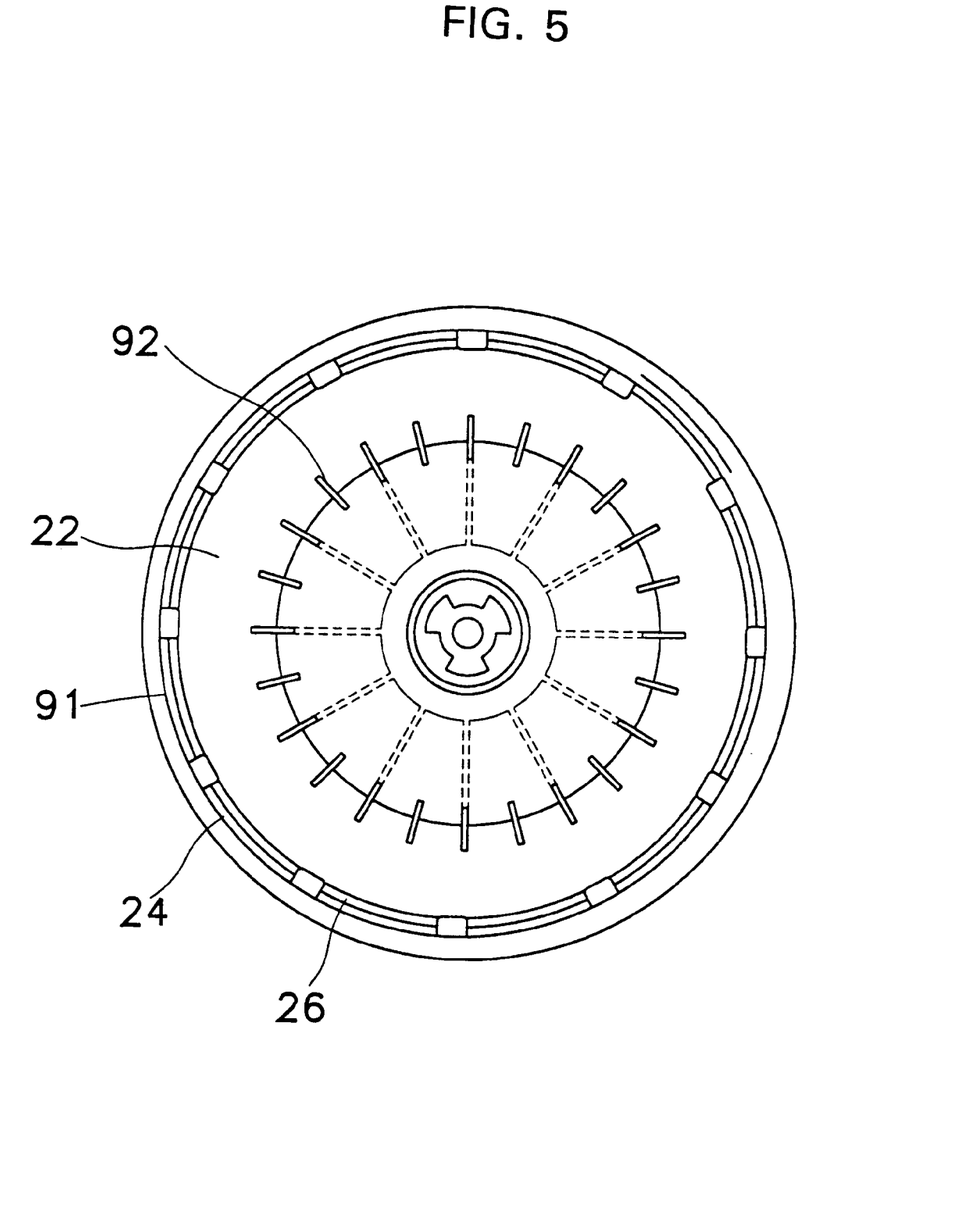
FIG. 5 is a perspective view illustrating the rotor according to the preferred embodiment of the present invention.

After the water is completely drained, the dehydrating operation is performed in a state where the drain valve 16 is opened. The operation of the power system 14 during the dehydrating stage will be described hereinafter with reference to FIGS. 2, 3 and 5b.

When the drain valve 16 is being opened by the drain motor (not shown) the power transmission system 30 changes to a dehydrating driving state. That is, when the drain motor is operated, the drain valve 16 is opened, and at the same time, the rotating gear 69 rotates the elevating gear 66. By the rotation of the elevating gear 66, the elevating projections 63 descend along the elevating guide slits 61 of the elevating guide member 60, thereby lowering the elevating ring 62.

As a result, the connecting gear 46 descends along the guide grooves 42 of the dehydrating shaft 40, and the inner teeth 48 of the descended connecting gear 46 mesh with outer teeth 74 of the coupling gear 53.

In this state, when power is applied to the reversible motor 20 so as to rotate the rotor 22 at a high speed, the laundering shaft 45 and the connecting gear 46 engaged with the coupling gear 53 also rotate at a high speed, thereby rotating the dehydrating shaft 40 at a high speed.

By this operation, the pulsator 13 and the spin basket 12 rotate at a high speed such that the water retained in the laundry is forced out by the centrifugal force and drained through the drain hose 15.

When the motor 20 stops, electrical power is applied to the motor such that a reversed magnetic flux can be gener-ated in the coil 24 and, thus, reversed electromagnetic force can be generated in the rotor 22. Therefore, the motor 20 generates a reverse rotational force such that the rotating speed of the rotor 22 is rapidly reduced and consequently stopped. The operation is controlled by a control portion of the washing machine.

In the above described motor 20, the radiating blades 92 limit any increase in the temperature of the core 23, which is caused by generation of eddy current as the variable magnetic force is applied to the core 23 of the stator when the motor 20 is operated. That is, the radiating blades 92 create an improved circulation of cooling air through the motor and cause the air situated directly beneath the stator to become turbulent. A turbulent air flow produces a better heat exchange action with the stator than does a laminar air flow.

While the invention has been described in connection with what is presently considered to be most practical and preferred embodiment, it is to be understood that the invention is not limited to the disclosed embodiment, but, on the contrary, it is intended to cover various modifications and equivalent arrangements included within the spirit and scope of the appended claims.

What is claimed is:

1. A motor adapted for use in a clothes washing machine, comprising:

a stator; and a rotor disposed around the stator and being rotatable about an axis; wherein said rotor includes a disk-shaped portion disposed beneath the stator and having cooling means for generating a flow of turbulent cooling air along the stator in response to rotation of the rotor;

wherein the cooling means comprises a plurality of blades projecting upwardly from an upper surface of the disk-shaped portion and extending in a radial direction with reference to the axis;

the disk-shaped portion including an upper surface having a radially extending portion and a sloping portion sloping upwardly from an inner edge of the radially extending portion toward the axis, the radially extending portion lying in a radial plane oriented perpendicularly to the axis, and the sloping portion sloping upwardly out of that plane;

each of the blades including a radially outer segment situated on the radially extending portion, and a sloping segment situated on the sloping portion, whereby the sloping segment extends to a higher elevation than the radially outer segment.

2. A clothes washing machine comprising:

a water tub;

a spin basket mounted in the water tub;

a pulsator mounted in the spin basket; and a motor mounted to an underside of the water tub and operably connectible to the spin basket and pulsator; the motor including a disk plate and a rotor core mounted adjacent an outer circumference of the disk plate; the disk plate mounted for rotation about a vertical axis; the stator disposed above the disk plate; the disk plate including an upper surface disposed beneath the stator; the upper surface including a plurality of radially extending blades for generating a flow of turbulent cooling air along the stator in response to rotation of the rotor the upper surface of the disk having a radially extending portion and a sloping portion sloping upwardly from an inner edge of the radially extending portion toward the axis, the radially extending portion lying in a radial plane oriented perpendicularly to the axis and the sloping portion sloping upwardly out of that plane;

the blades disposed below the stator, each of the blades including a radially outer segment situated on the radially extending portion, and a sloping segment situated on the sloping portion, whereby the sloping segment extends to a higher elevation than the radially outer segment.

* * * * *